United States Patent Office 3,301,876
Patented Jan. 31, 1967

3,301,876
2/3 - OXYGENATED - 2/3 - THIOCYANATO-5α-
ANDROSTAN-17-ONES AND DERIVATIVES
THEREOF
Paul D. Klimstra, Northbrook, Ill., assignor to G. D.
Searle & Co., Chicago, Ill., a corporation of Delaware
No Drawing. Filed Nov. 30, 1964, Ser. No. 414,905
11 Claims. (Cl. 260—397.3)

This application is a continuation-in-part of my copending application Serial No. 300,916, filed August 8, 1963, and now abandoned.

The invention disclosed herein relates to novel steroidal derivatives of the androstane series characterized by a thiocyanato substituent in the A-ring and, especially, to 2/3-oxygenated-2/3-thiocyanato-5α- androstane - 17-ones and derivatives thereof represented by the following structural formula

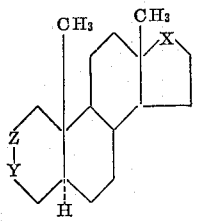

wherein X can be a carbonyl, β-hydroxymethylene, α-(lower alkyl)-β-hydroxymethylene, α-lower alkynyl)-β-hydroxymethylene, or β-(lower alkanoyl)oxymethylene radical; Y is a carbonyl, hydroxymethylene, (lower alkanoyl)oxymethylene, or α-thiocyanatomethylene radical; and Z is a carbonyl, β-hydroxymethylene, β-(lower alkanoyl)oxymethylene, or thiocyanatomethylene group.

The lower alkyl radicals symbolized in the foregoing structural representation are typified by methyl, ethyl, propyl, butyl, pentyl, hexyl, and the branched-chain groups isomeric therewith. Examples of the lower alkynyl groups therein depicted are ethynyl, propynyl, butynyl, pentynyl, hexynyl, and the branched-chain isomers thereof. The lower alkanoyl groups embraced by that formula are those encompassed by the following representation

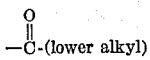

wherein the term "lower alkyl" has the identical meaning as defined above.

The compounds of the present invention are conveniently produced by utilizing 2,3-epoxides of the following structural formula

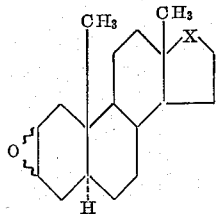

wherein X has the same meaning as hereinbefore indicated, as starting materials. The wavy lines indicate that the epoxide starting material can be either the 2α,3α or 2β,3β species. Those substances are contacted with thiocyanic acid in a suitable organic solvent. The nature of the product obtained depends upon the configuration of the epoxide linkage. Thus, the α-epoxides afford the 2β-thiocyanato-3α-ols while the β-epoxides yield the 3α-thiocyanato-2β-ols. Specific examples of the process involved are the reaction of 2α,3α-epoxy-5β-androstan-17-one with an ethereal solution of thiocyanic acid at room temperature for about 3 days to afford 3α-hydroxy-2β-thiocyanato-5α-androstan-17-one and the reaction of 2β,3β-epoxy-17α-methyl-5α-androstan-17β-ol with thiocyanic acid under similar conditions to produce 17α-methyl - 3α-thiocyanato-5α-androstane-2β,17β-diol. The thiocyanic acid reagent is preferably produced in situ by treating an alkali metal thiocyanate such as potassium thiocyanate with a strong mineral acid such as hydrochloric, sulfuric, or phosphoric in a two-phase system consisting of water and the organic solvent to be used for the reaction. Thus, the addition of phosphoric acid to an aqueous solution of potassium thiocyanate produces thiocyanic acid, which is extracted into ether immediately upon formation. The steroidal material is then directly added to that ethereal solution.

Oxidation of the aforementioned 2β-hydroxy and 3α-hydroxy substances affords the corresponding instant keto derivatives. The reaction of 2β-hydroxy-3α-thiocyanato-5α-androstan-17-one, for example, with aqueous chromic acid in acetone affords 3α-thiocyanato-5α-androstane-2,17-dione.

An alternate route to the instant compounds involves reaction of the appropriate α-bromo ketone with an inorganic thiocyanate. Alkali metal thiocyanates such as the potassium and sodium salts are particularly suitable. Illustrative of that process is the reaction of 2α-bromo-5α-androstane-3,17-dione with potassium thiocyanate to produce 2α-thiocyanato-5α-androstane-3,17-dione. Reduction of the instant α-thiocyanato ketones affords the corresponding α-thiocyanato alcohols. The aforementioned 2α-thiocyanato-5α-androstane-3,17-dione, for example, is contacted with lithium tri-(tertiary-butoxy) aluminum hydride in tetrahydrofuran, thus affording 2α-thiocyanato-5α-androstane-3,β17β-diol.

Acylation of the instant 2/3-hydroxy compounds with a lower alkanoic acid anhydride or halide in the presence of a suitable acid acceptor results in the corresponding (lower alkanoates). The room temperature reaction of 17α-ethynyl-3α-thiocyanato-5α-androstane-2β,17β-diol or 3α-hydroxy-2β-thiocyanato-5α-androstan-17-one with acetic anhydride in pyridine thus affords 17α-ethynyl-3α-thiocyanato-5α-androstane-2β,17β-diol 2-acetate and 3α-hydroxy-2β-thiocyanato-5α-androstan-17-one 3-acetate, respectively.

The compounds of the present invention display valuable pharmacological properties. They are hormonal and anti-hormonal agents, for example, as is evidenced by their anabolic, androgenic, and estrogen-inhibitory properties. In addition, they exhibit anti-algal activity in view of their ability to inhibit the growth of such organisms as *Chlorella vulgaris*.

The invention will appear more fully from the examples which follow. These examples are set forth by way of illustration only, and it will be understood that the invention is not to be construed as limited either in spirit or in scope by the details contained therein as many modifications in materials and methods will be apparent from this disclosure to those skilled in the art. In these examples, temperatures are given in degrees centigrade (°C.). Quantities of materials are expressed in parts by weight unless otherwise noted.

*Example 1*

To a solution of 2.9 parts of 17α-methyl-5α-androst-2-en-17β-ol and 0.4 part of anhydrous sodium acetate in 112 parts of chloroform is added dropwise, with stirring and cooling, 4 parts by volume of a 40% peracetic acid in acetic acid solution. The resulting reaction mixture is allowed to stand at room temperature for about 2 hours, then is washed with dilute aqueous potassium hydroxide, dried over anhydrous sodium sulfate, and concentrated to dryness at reduced pressure. Recrystallization of the residue from ethanol affords 2α,3α-epoxy-17α-methyl-5α-androstan-17β-ol, melting at about 205–207° and displaying an optical rotation of +0.5° in chloroform.

*Example 2*

The substitution of 3 parts of 17α-ethyl-5α-androst-2-en-17β-ol in the procedure of Example 1 results in 2α,3α-epoxy-17α-ethyl-5α-androstan-17β-ol.

*Example 3*

To a solution of 5 parts of 3α-bromo-17α-methyl-5α-androstane-2β,17β-diol in 317 parts of tetrahydrofuran is added a solution of 1.5 parts of sodium carbonate in 103 parts of water. The resulting reaction mixture is stirred at room temperature for about 47 hours, then is poured into a mixture of ice and water. The precipitate which forms is collected by filtration, washed on the filter with water, and dried. Recrystallization of that solid from acetone-hexane affords 2β,3β-epoxy-17α-methyl-5α-androstan-17β-ol, melting at about 157–159° and characterized also by an optical rotation of +25° in chloroform.

*Example 4*

The substitution of 5.2 parts of 3α-bromo-17α-ethyl-5α-androstane-2β,17β-diol in the procedure described in Example 3 results in 2β,3β-epoxy-17α-ethyl-5α-androstan-17β-ol.

*Example 5*

To a solution of 12 parts of the 30% lithium acetylide-70% ethylene diamine complex in 63 parts of tetrahydrofuran, in a nitrogen atmosphere, is added, over a period of about 30 minutes with stirring at room temperature, a solution of 5.3 parts of 2β,3β-epoxy-5α-androstan-17-one in 99 parts of tetrahydrofuran. The resulting reaction mixture is stirred at room temperature for about 2½ hours, then is poured into cold aqueous ammonium chloride. That aqueous mixture is acidified by the addition of dilute hydrochloric acid, and the resulting precipitate is collected by filtration, washed on the filter with water, and dried in air. Recrystallization of that solid from aqueous acetone results in pure 2β,3β-epoxy-17α-ethynyl-5α-androstan-17β-ol, melting at about 216–218°. It is characterized further by infrared absorption peaks at about 2.75, 3.1, and 3.4 microns (chloroform).

*Example 6*

The substitution of an equivalent quantity of lithium propynylide in the procedure of Example 5 results in 2β,3β-epoxy-17α-(1-propynyl)-5α-androstan-17β-ol.

*Example 7*

To a cold solution of 40 parts of potassium thiocyanate in 20 parts of water is added 105 parts of ether, and this mixture is shaken while 60 parts of 85% phosphoric acid is added portionwise. The resulting purple ethereal solution is separated, washed with water, then dried over anhydrous sodium sulfate. To that ethereal thiocyanic acid solution is added 3.7 parts of 2α,3α-epoxy-5α-androstan-17-one, and the resulting reaction mixture is stirred rapidly for about 15 minutes, then is stored at room temperature for about 70 hours. That solution is washed successively with 10% aqueous sodium carbonate and water, then is dried over anhydrous sodium sulfate containing decolorizing carbon. Removal of the solvent by distillation at reduced pressure affords an oil which solidifies on standing. Recrystallization of that solid from ethanol results in pure 3α-hydroxy-2β-thiocyanato-5α-androstan-17-one, melting at about 177–180°. This compound displays an optical rotation of +78° in chloroform and is characterized further by the structural formula

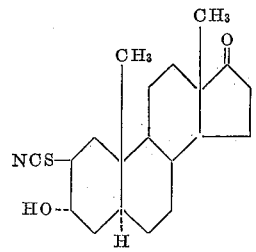

*Example 8*

To a cold solution of 10 parts of potassium thiocyanate in 6 parts of water is added 28 parts of ether, and this mixture is shaken while 15 parts of 85% phosphoric acid is added in small portions. The purple ether layer is separated and washed with water, then dried over anhydrous sodium sulfate. To that ethereal solution is added one part of 2α,3α-epoxy-17α-methyl-5α-androstan-17β-ol, and the resulting reaction mixture is shaken to effect solution, then is allowed to stand at room temperature for about 70 hours. The slightly purple reaction mixture is washed with 10% aqueous sodium carbonate until the color disappears, then is washed with water. Ethyl acetate is added to dissolve the small amount of precipitate which forms, and this organic solution is dried over anhydrous sodium sulfate and stripped of solvent by distillation at reduced pressure. The resulting solid residue is recrystallized from acetone to afford 17α-methyl-2β-thiocyanato-5α-androstane-3α,17β-diol, melting at about 207–210° and characterized further by an optical rotation of +35° in chloroform. Infrared absorption maxima are observed at about 2.74, 3.4, 4.62, and 5.82 microns. This compound is represented by the structural formula

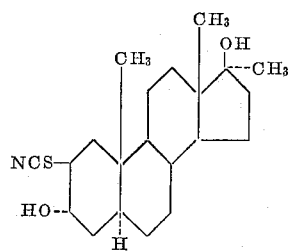

*Example 9*

By substituting 1.05 parts of 2α,3α-epoxy-17α-ethyl-5α-androstan-17β-ol and otherwise proceeding according to the processes described in Example 8, 17α-ethyl-2β-thiocyanato-5α-androstane-3α,17β-diol is obtained.

*Example 10*

An ethereal solution of thiocyanic acid is prepared according to the procedure described in Example 8. To that ethereal solution is added one part of 2β,3β-epoxy-17α-methyl-5α-androstan-17β-ol, and this reaction mixture is allowed to stand at room temperature for about 72 hours. Successive washings of that organic solution with 10% aqueous sodium carbonate and water followed by drying over anhydrous sodium sulfate containing decolorizing carbon affords a solution which is stripped of solvent at reduced pressure. The resulting residual solid is recrystallized from acetone-hexane to afford pure 17α-methyl-3α-thiocyanato-5α-androstane-2β,17β - diol, melting at about 183–185°. It displays an optical rotation of +17.5° in chloroform and is characterized further by the structural formula

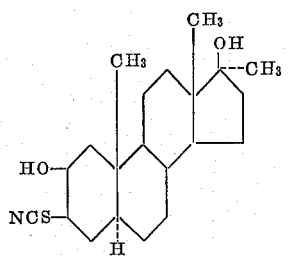

Example 11

When 1.05 parts of 2β,3β-epoxy-17α-ethyl-5α-androstan-17β-ol is allowed to react with thiocyanic acid according to the procedure of Example 10, 17α-ethyl-3α-thiocyanato-5α-androstane-2β,17β-diol is obtained.

Example 12

To a cold solution of 15 parts of potassium thiocyanate in 8.5 parts of water is added 60 parts of ether, then 23 parts of 85% phosphoric acid in portions with intermittent shaking. After the phosphoric acid addition has been completed, the ether layer is separated, washed with water, and dried over anhydrous sodium sulfate. The drying agent is washed with ether, and the ether solutions are combined. To that ethereal solution of thiocyanic acid is added 1.3 parts of 2α,3α-epoxy-17α-ethynyl-5α-androstan-17β-ol, and the resulting solution is stored at room temperature for about 3 days. At the end of that reaction period, the mixture is filtered to remove a small amount of insoluble material, and the filtrate is washed successively with 10% aqueous sodium carbonate and water, then is dried over anhydrous sodium sulfate containing decolorizing carbon and evaporated to dryness at reduced pressure to yield 17α-ethynyl-2β-thiocyanato-5α-androstane-3α,17β-diol as a glass. Infrared absorption maxima are observed at about 2.75, 3.1, 3.4, 4.52, and 9.87 microns. This compound is represented by the structural formula

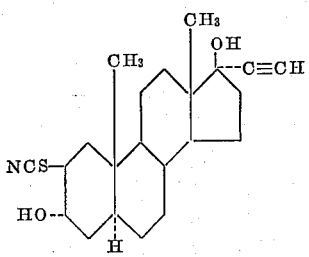

Example 13

By substituting 1.4 parts of 17α-(1-butynyl)-2α,3α-epoxy-5α-androstan-17β-ol and otherwise proceeding according to the processes described in Example 12, 17α-(1-butynyl)-2β-thiocyanato-5α-androstane-3α,17β-diol is obtained.

Example 14

To a two-phase system consisting of a cold solution of 55 parts of potassium thiocyanate in 37 parts of water and 140 parts of ether is added, portionwise with shaking, 83 parts of 85% phosphoric acid. The ether layer is then separated, washed with water, and dried quickly over anhydrous sodium sulfate. That ethereal solution of thiocyanic acid is then added to a solution of 5 parts of 2β,3β-epoxy-5α-androstan-17-one in 14 parts of ether, and the resulting reaction mixture is stored at room temperature for about 3 days. Washing of this solution with 10% aqueous sodium carbonate then with water followed by drying over anhydrous sodium sulfate affords an organic solution which is stripped of solvent at reduced pressure. Successive recrystallizations of the residual solid from aqueous methanol results in pure 2β-hydroxy-3α-thiocyanato-5α-androstan-17-one, melting at about 204–206°. This substance possesses an optical rotation of +85.5° in chloroform and is characterized further by the structural formula

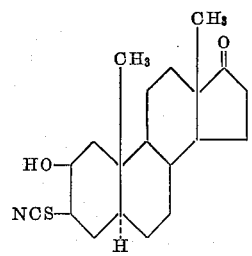

Example 15

To a cold solution of 30 parts of potassium thiocyanate in 17 parts of water is added successively 119 parts of ether and 46 parts of 85% phosphoric acid, portionwise with shaking. The ethereal layer is then separated, washed twice with a minimum quantity of water, and dried over anhydrous sodium sulfate. To that ethereal solution of thiocyanic acid is added a warm solution of 3 parts of 2β,3β-epoxy-17α-ethynyl-5α-androstan-17β-ol in 70 parts of ether, and the resulting reaction mixture is allowed to stand at room temperature for about 3 days. After completion of the reaction period, that mixture is washed with 10% aqueous sodium carbonate until neutral then several times with water. Drying over anhydrous sodium sulfate containing decolorizing carbon followed by distillation of the solvent at reduced pressure affords a glass-like residue. That residue is triturated with hexane, resulting in 17α-ethynyl-3α-thiocyanato-5α-androstane-2β,17β-diol, melting at about 171–177°. Recrystallization of that crude product from aqueous methanol affords the pure material, characterized by a melting point of about 188–190.5°. This substance is represented by the structural formula

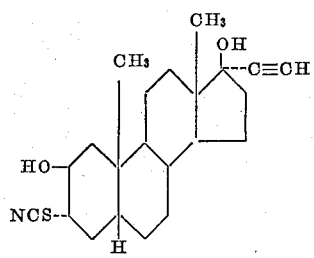

Example 16

The substitution of 3.13 parts of 2β,3β-epoxy-17α-(1-propynyl)-5α-androstan-17β-ol in the procedure described in Example 15 results in 17α-(1-propynyl)-3α-thiocyanato-5α-androstane-2β,17β-diol.

Example 17

A mixture of 5 parts of 17α-ethynyl-3α-thiocyanato-5α-androstane-2β,17β-diol, 20 parts of acetic anhydride, and 40 parts of pyridine is allowed to stand at room temperature for about 18 hours in an atmosphere of nitrogen. The reaction mixture is then poured into a mixture of ice and water, resulting in separation of an oily precipitate. This mixture is cooled further at about 0–5°, and the resulting tacky precipitate is collected by filtration and washed with water. Extraction with ether affords an organic solution which is washed with water, then dried over anhydrous potassium carbonate containing decolorizing carbon and stripped of solvent at reduced pressure to yield 17α-ethynyl-3α-thiocyanato-5α-androstane-2β,17β - diol 2-acetate as a glass. Recrystallization from aqueous methanol affords needle-like crystals melting at about 214–217°. This compound can be represented by the structural formula

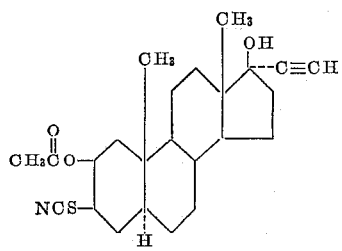

Example 18

A mixture of 4.9 parts of 17α-methyl-3α-thiocyano-5α-androstane-2β,17β-diol, 25.5 parts of propionic anhydride, and 40 parts of pyridine is stored at room temperature, under nitrogen, for about 18 hours, then is poured slowly into ice-cold water. The resulting aqueous mixture is extracted with ether, and the ether solution is separated, washed with water, and dried over anhydrous potassium carbonate containing decolorizing carbon. Removal of the ether by distillation at reduced pressure affords 17α-methyl-3α-thiocyanato-5α-androstane - 2β,17β-diol 2-propionate. Infrared absorption maxima are observed at about 2.75, 3.40, 4.62, 5.78, and 7.95 microns.

Example 19

The substitution of 5 parts of 2β-hydroxy-3α-thiocyanato-5α-androstan-17-one in the procedure described in Example 17 results in 2β-acetoxy-3α-thiocyanato-5α-androstan-17-one.

Example 20

A mixture of 12 parts of 2α-bromo-5α-androstane-3,17-dione and 8 parts of potassium thiocyanate with 320 parts of acetone is heated at the reflux temperature for about 6½ hours, then is cooled and filtered to remove precipitated inorganic salts. Partial concentration of the filtrate by distillation under reduced pressure followed by dilution with water results in precipitation of the crude product, which is collected by filtration, washed on the filter with water, and dried in air. That material is recrystallized from ethyl acetate to yield pure 2α-thiocyanto-5α-androstane-3,17-dione, melting at about 212–214° with decomposition and further characterized by the following structural formula

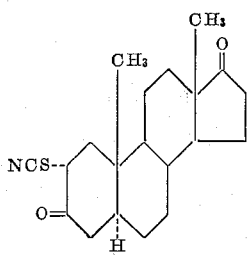

Example 21

To a solution of 4 parts of 2α-thiocyanato-5α-androstane-3,17 dione in 90 parts of tetrahydrofuran, at 0–5°, is added a solution of 20 parts of lithium tri-(tertiary-butoxy) aluminum hydride in 90 parts of tetrahydrofuran. The resulting reaction mixture is stirred for about one hour, then is quenched by pouring into a mixture of ice and water containing excess acetic acid. Extraction of the resulting acidic aqueous mixture with ether affords an organic solution which is washed successively with water, 5% aqueous sodium bicarbonate and water, then dried over anhydrous sodium sulfate. Removal of the solvent by distillation under reduced pressure affords the crude product as a white solid. Recrystallization of that material from acetone-hexane affords pure 2α-thiocyanato-5α-androstane-3β,17β-diol, melting at about 202–205°. It is characterized further by an optical rotation of +23° in chloroform and can be represented by the following structural formula

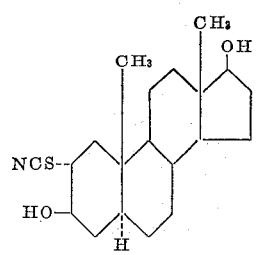

Example 22

To a solution of one part of 17α-ethynyl-3α-thiocyanato-5α-androstane-2β,17β-diol in 8 parts of acetone is added an aqueous solution, 8 N in chromium trioxide and 8 N in sulfuric acid, until a slight excess of the oxidant is present. The reaction mixture is then poured carefully into a mixture of ice and water, and the resulting aqueous mixture is extracted with ether. The ether layer is separated, washed with water, and dried over anhydrous potassium carbonate containing decolorizing carbon. Removal of the solvent by distillation under reduced pressure affords the crude product as an oil. That material is purified by chromatography on silica gel followed by elution of the column with 95% ethyl acetate in benzene. The resulting 17α-ethynyl-17α-hydroxy-3α-thiocyanato-5α-androstan-2-one is characterized by infrared absorption maxima, in chloroform, at about 2.75, 3.01, 3.42, 4.68, and 5.83 microns and also by the following structural formula

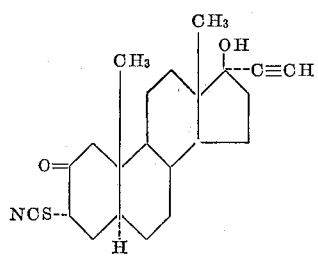

Example 23

A solution of 10 parts of 2α-hydroxy-3α-thiocyanato-5α-androstan-17-one in 120 parts of acetone is allowed to react with aqueous chromic acid according to the procedure described in Example 22. The reaction mixture is filtered through diatomaceous earth, and the filtrate is diluted with water, then extracted with a 1:1 mixture of ether and ethyl acetate. The organic extract is washed successively with 5% aqueous sodium bicarbonate and water, then dried over anhydrous sodium sulfate containing decolorizing carbon. The dried solution is stripped of solvent under reduced pressure to afford 3α-thiocyanato-5α-androstane-2,17-dione as an oil. Infrared absorption maxima, in chloroform, are observed at about 3.40, 4.65, 5.75, and 5.83 microns. This compound is represented by the following structural formula

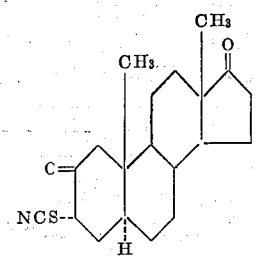

Example 24

To a solution of 5.5 parts of 2α,3α-epoxy-5α-androstan-17β-ol 17-acetate in 105 parts of acetic acid is added 100 parts by volume of a 1 N thiocyanic acid solution in 70% aqueous acetic acid. The resulting reaction mixture is stirred at room temperature for about 24 hours, then is carfully poured into water. The resulting precipitate is collected by filtration, washed on the filter with water and dried in air to yield the crude product. Recrystallization from a small quantity of aqueous methanol results in pure 2β-thiocyanato-5α-androstane-3α,17β-diol 17-acetate, melting at about 137–140°.

Example 25

To a solution of 3 parts of 3α-bromo-17β-hydroxy-17α-methyl-5α-androstan-2-one in 48 parts of acetone is added a solution of 2 parts of potassium thiocyanate in 32 parts of acetone. The resulting reaction mixture is heated at the reflux temperature for about 2 hours, then is cooled and filtered. The filtrate is diluted with water, and the resulting precipitate is collected by filtration, washed on the filter with water, and dried in air. Recrystallization of the crude product from aqueous acetone affords 17β-hydroxy-17α-methyl-3α-thiocyanato-5α-androstan-2-one, melting at about 94–96°. This substance is further characterized by an optical rotation, in chloroform, of −45.5° and by infrared absorption maxima at about 2.75, 3.40, 4.68, and 5.79 microns. It can be represented by the following structural formula

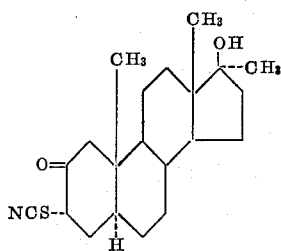

Example 26

By substituting an equivalent quantity of 3α-bromo-17α-ethyl-17β-hydroxy-5α-androstan-2-one and otherwise proceeding according to the processes described in Example 25, there is obtained 17α-ethyl-17β-hydroxy-3α-thiocyanato-5α-androstan-2-one.

Example 27

The substitution of an equivalent quantity of 2α,3α-epoxy-5α-androstan-17β-ol 17-propionate in the procedure of Example 24 results in 2β-thiocyanato-5α-androstane-3α,17β-diol 17-propionate.

Example 28

The substitution of an equivalent quantity of 3α-hydroxy-2β-thiocyanato-5α-androstan-17-one in the procedure of Example 17 results in 3α-hydroxy-2β-thiocyanato-5α-androstan-17-one 3-acetate.

Example 29

By substituting an equivalent quantity of 17α-methyl-2β-thiocyanato-5α-androstane-3α,17β-diol and otherwise proceeding according to the processes described in Example 22, there is obtained 17β-hydroxy-17α-methyl-2β-thiocyanato-5α-androstan-3-one.

What is claimed is:
1. A compound of the formula

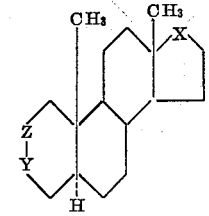

wherein X is selected from the group consisting of carbonyl, α-(lower alkyl)-β-hydroxymethylene and α-(lower alkynyl)-β-hydroxymethylene when Y is a member of the class consisting of carbonyl, α-hydroxymethylene, α-(lower alkanoyl)oxymethylene and α-thiocyanatomethylene and when Z is a member of the class consisting of carbonyl, β-hydroxymethylene, β-(lower alkanoyl)oxymethylene and thiocyanatomethylene, one but not both of the radicals represented by Y and Z at all times being thiocyanatomethylene, and X is selected from the group consisting of carbonyl, β-hydroxymethylene, β-(lower alkanoyl)-oxymethylene, α-(lower alkyl)-β-hydroxymethylene and α-(lower alkynyl)-β-hydroxymethylene when one of the groups represented by Y and Z is carbonyl.

2. 2α-thiocyanato-5α-androstane-3,17-dione.
3. 2β - acetoxy - 17α - ethynyl-3α-thiocyanato-5α-androstan-17β-ol.
4. A compound of the formula

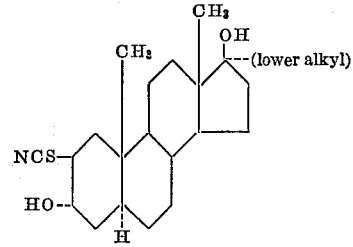

5. 17α-methyl-2β-thiocyanato - 5α - androstane-3α,17β-diol.
6. A compound of the formula

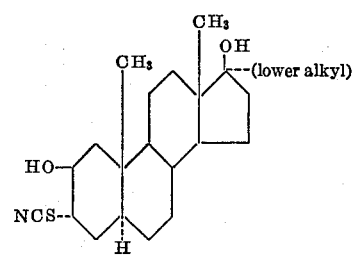

7. 17α-methyl-3α-thiocyanato - 5α - androstane-2β,17β-diol.
8. A compound of the formula

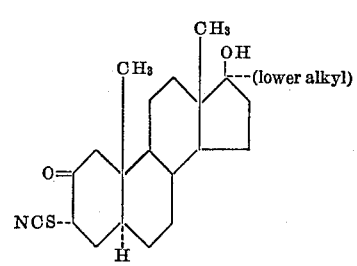

9. 17β - hydroxy - 17α - methyl-3α-thiocyanato-5α-androstan-2-one.
10. A compound of the formula
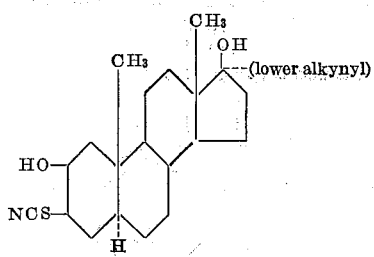
11. 17α - ethynyl - 3α - thiocyanato-5α-androstane-2β-17β-diol.
References Cited by the Examiner
UNITED STATES PATENTS
| | | | |
|---|---|---|---|
| 3,018,298 | 1/1962 | Klimstra et al. | 260—397.4 |
| 3,105,831 | 10/1963 | Komeno | 260—239.5 |
| 3,169,128 | 2/1965 | Komeno | 260—239.5 |
| 3,230,215 | 1/1966 | Komeno | 260—239.5 |
LEWIS GOTTS, *Primary Examiner.*
JOHNNIE R. BROWN, *Assistant Examiner.*

UNITED STATES PATENT OFFICE
CERTIFICATE OF CORRECTION

Patent No. 3,301,876                          January 31, 1967

Paul D. Klimstra

It is hereby certified that error appears in the above numbered patent requiring correction and that the said Letters Patent should read as corrected below.

Column 1, line 28, for "α-lower alkynyl)" read -- α-(lower alkynyl) --; column 2, line 34, for "3,β17β-" read -- 3β, 17β- --; column 7, lines 9 to 19, for the lower left-hand portion of the formula reading

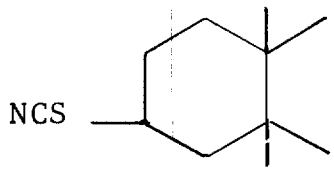      read      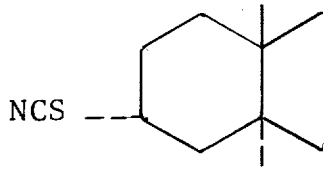

column 7, line 21, for "thiocyano" read -- thiocyanato --; column 8, line 41, for "17α-hydroxy-" read -- 17β-hydroxy- --; line 62, for "2α" read -- 2β --; column 11, lines 4 to 13, the left-hand portion of the formula should appear as shown below instead of as in the patent:

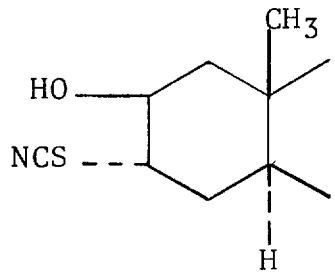

Signed and sealed this 28th day of November 1967.

(SEAL)
Attest:

EDWARD M. FLETCHER, JR.                   EDWARD J. BRENNER
Attesting Officer                               Commissioner of Patents